United States Patent Office 3,396,514
Patented Aug. 13, 1968

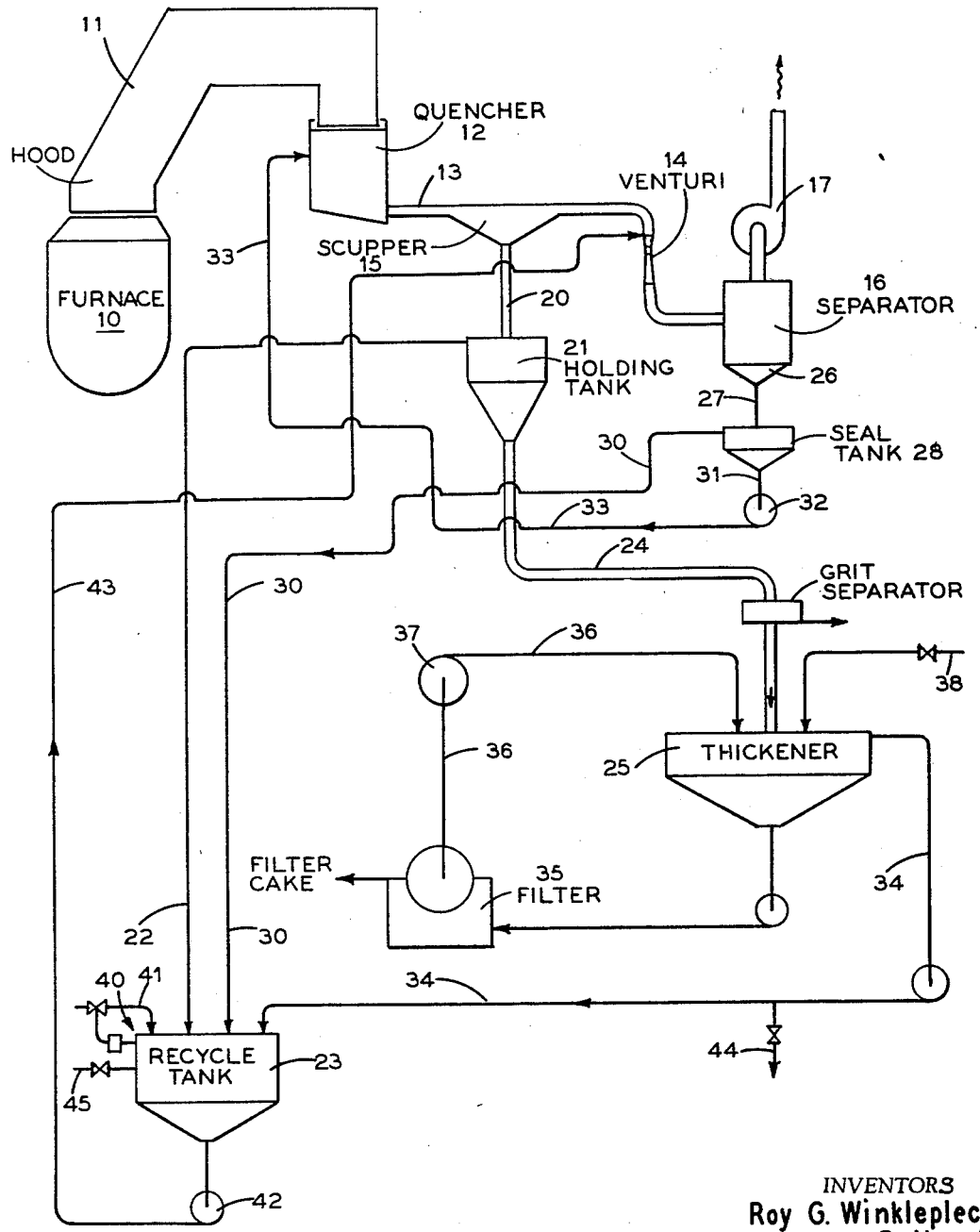

3,396,514
GAS CLEANING SYSTEM
Thomas B. Hurst, Akron, and Roy G. Winklepleck, Hudson, Ohio, assignors to The Babcock & Wilcox Company, New York, N.Y., a corporation of New Jersey
Filed Nov. 7, 1966, Ser. No. 592,535
6 Claims. (Cl. 55—227)

ABSTRACT OF THE DISCLOSURE

Apparatus for removing entrained solids from hot gases, and in particular wet scrubbing apparatus for removing solids from cyclically or intermittently produced hot gases where recirculated water is used for cooling the gases and removing the entrained solids from the gases.

When hot dust-laden gases are discharged from a furnace or the like it has been found desirable to reduce the temperature of the gases before the final dust removal effects are accomplished. Solids removal may be effected by dry methods, such as electrical (electrostatic) or mechanical (bag collectors and the like), where the gases are cooled to a preferred condition typical of the particular process in use. When the dust removal is attained by wet methods, such as in a liquid spray scrubber, the gases are evaporatively cooled generally to a saturation temperature which may be of the order of 185° F. In most cases the gases are cooled by the evaporation of water delivered thereto in spray form or by the injection of steam.

In the present invention a wet scrubber of the venturi type is utilized for final dust removal from the gases to minimize atmospheric pollution, and an evaporative gas cooling device or quencher is utilized to not only reduce gas temperature to saturation, but also to remove at least the larger particles of the dust entrained with the gases. With the larger dust particles removed in the quencher and with final dust removal occurring in the venturi scrubber, the dust and liquid is separated from the gases following the quencher and the scrubber with the slurry treated to separately reclaim water and solids.

The water flow circuit includes a series of retention settling tanks and a thickener so as to minimize the amount of water treated in the thickener. According to the invention the flow of water to the quencher and the venturi scrubber is maintained at a substantially constant volume. The supply of water to the venturi scrubber is obtained from a tank which accumulates all of the water from the various water collection points of the system, after a portion of such water has been clarified in a thickener, so that the quality of the water delivered to the venturi scrubber is relatively high. Ordinarily the water delivered to the scrubber will have less than 5000 p.p.m. of solids therein so as to minimize pluggage of its spray nozzles.

In the single figure of the drawing a diagrammatic layout of the gas and water flow circuit is arranged according to the present invention.

In the illustrated embodiment of the invention the hot dust-laden gases originate in a basic oxygen furnace 10 where molten metal such as iron is subjected to the refining action of a jet of oxygen. The bases leaving the furnace contain entrained or suspended dust particles consisting predominately of iron oxides. The gases, with the entrained solids leave the furnace at a temperature in the order of 3000° F. and are passed through a water cooled hood 11 such as that disclosed in U.S. Patent 3,168,073. The hot gases leaving the hood are usually at a temperature of the order of 3000° F. and are passed through a quencher 12 where the gases are contacted by large volumes of sprayed water to reduce the temperature of the gases to about 185° F. During the water spray contact of the gases the larger particles of entrained dust are separated from the gases by gravitational effects and may either be removed from the bottom of the quencher 12 by means of a separate slurry outlet, or will flow along the lower surface of the dust 13 leading from the quencher 12 to a wet scrubber 14.

In the quencher 12, the water required for cooling the gas by evaporation will represent only a portion of the total quantity of water delivered thereto, so that an appreciable quantity of water, with entrained solids therein, will flow along the lower portion of the duct 13 to a scupper 15 or hooper. The gases entering the venturi scrubber 14 from the duct 13 are accelerated to a velocity of the order of from 100–400 feet per second and are contacted by sprays of liquid to agglomerate the finer dust particles for subsequent removal in a separator 16. Thereafter, the relatively clean gas may be passed through a condensing tower (not shown) or directly to the atmosphere through the induced draft fan 17.

The water and relatively coarse solids collected in the scupper 15 are discharged through a pipe 20 to a holding tank 21. The holding tank is sized for a storage capacity representative of a percentage of the hourly flow rate of water to the quencher so that the liquids and solids discharged to the tank 21 will be retained a sufficient length of time to obtain at least some gravity separation effect between the coarse solids and the water. The cleaner water will overflow or be decanted from the upper portion of the holding tank through a pipe 22 leading to a recycle tank 23, hereinafter described. The coarse particles with the remaining water form a slurry which discharges at a controlled substantially uniform rate through a pipe 24 leading to a thickener 25.

The liquids and solids separated in the separator 16 discharge from the hopper bottom 26 of the separator through a discharge pipe 27 into a seal tank 28 which also has a substantial retention capacity to permit at least some gravity separation of solids and liquids. The relatively cleaner water overflows or is decanted from the top of the seal tank and is passed through a pipe 30 to the recycle tank 23. The bottom of the seal tank is connected through a pipe 31 to a pump 32 which discharges liquid, with some entrained solids through a pipe 33 directly to the spray nozzles positioned in the quencher 12. The water passed to the quencher 12 through pipe 33 may contain solids of the order of 10,000 p.p.m., and the spray nozzles in the quencher 12 are constructed with a substantial clearance to permit spray atomization of the relatively dirty liquid entering the quencher.

The thickener 25 separates water from the slurry collected therein so that the overflow water discharge from the upper portion of the thickener through the pipe 34 to the recycle tank 23, will be relatively clean. The slurry withdrawn from the bottom of the thickener is pumped to a filter 35 where the solids and liquids are further separated resulting in a filter cake which contains approximately 2 pounds of solids per pound of water which may be then used as a raw material in the iron producing process. The water from the filter 35 is returned to the thickener 25 through the pipe 36 and pump 37. The thickener 25 is provided with a valved inlet pipe 38 for the addition of makeup water to the thickener during emergency or startup conditions.

The recycle tank 23 receives overflow liquid from the holding tank 21, the seal tank 28 clean water from the thickener 25 and makeup water to compensate for water removed with the filter cake, evaporative loss and other system losses. The tank 23 is provided with a level control 40 to regulate the addition of system makeup water through pipe 41, responsive to the level of liquid in the recycle tank. The pump 42 withdraws relatively clean water from the bottom of the recycle tank to supply the venturi 14 through pipe 43, as hereinbefore described. Ordinarily the water supplied to the venturi will have a solids content of less than 5000 parts per million (p.p.m.).

The pipe 34 is provided with a valved blow down line 44 for the withdrawal of a selected quantity of water, so as to maintain desired pH conditions within the fluid flow system. In many installations blow down is adequate for pH control. However, in other installations, it is desirable to provide a valved connection 45, for example, to the recycle tank for chemical additions to the system. Such chemical additions can be used for pH control separately or in conjunction with the blow down, and can also be used for injection of chemicals for cleaning the pipes forming the water flow circuit.

As an example of the operation of the described invention, the furnace 10 will emit dust-laden gases for a period of about 20 minutes. Thereafter during the charging period the furnace will not be discharging gases for approximately 30 minutes. Thus, the gas supply to the gas clean-up system will be cyclic. Under these conditions it may be assumed for purposes of illustration the furnace will discharge approximately 10 million pounds of gas per hour with a dust content of, for example, 9000 pounds per hour.

Even though the supply of gas to the gas clean-up system is cyclic, spray water will be supplied to both the quencher 12 and the venturi 14 at a substantially constant rate. For example, the quencher 12 may be supplied with 2300 gallons per minute of spray liquid which may have a solids content of the order of 7700 p.p.m. At the same time the venturi will be supplied with spray liquid at a rate, for example of 4600 gallons per minute where the liquid will have a solids content not exceeding 5000 p.p.m.

With these flow rates to the dust separating devices of the invention, the scupper 15 will collect and discharge a minimum of 1600 gallons per minute with a solids content of the order of 11,600 p.p.m. It will be noted that when gas is passing from the furnace 10 through the quencher 12 the evaporating effect of the hot gases will remove approximately 700 gallons per minute of the 2300 gallons per minute delivered thereto. Thus when gas is passed through the duct system only 1600 gallons per minute will be available for flow from the holding tank 21 to the thickener. At the same time approximately 700 gallons per minute of liquid, from the quencher 12, will be discharged through the exhaust fan 17 in the form of vapor with the relatively clean gases and discharged to the atmosphere. During periods when no hot gases are passing through the quencher 12 there will be an excess of liquid delivered to the holding tank of the order of 700 gallons per minute. This water will be decanted from the upper part of the holding tank 21 and passed through the pipe 22 to the recycle tank 23. Thus during a portion of a complete furnace cycle, from charge to charge of the furnace, liquid will be discharged from the holding tank to the recycle tank and during another portion of the cycle little or no liquid will be discharged through the line 22.

With the venturi being supplied with 4600 gallons per minute, and since the gases will be substantially saturated when delivered to the venturi, substantially all the liquid will be removed from the separator 16 for discharge to the seal tank 28. The pump 23 withdrawing liquid from the seal tank discharges at a substantially continuous rate equal to 2300 gallons per minute to the quencher 12. The remaining liquid will be decanted from the upper end of the seal tank through pipe 30 and delivered to the recycle tank 23.

The thickener 25 receives 1600 gallons per minute at a constant flow rate from the holding tank 21 and separates a major portion of the solids from the liquids. The water discharged from the thickener will have a solids content of the order of 200 p.p.m.

Thus the liquid delivered to the recycle tank will be made up of liquids having different solids contents equal in quantity to 4600 gallons per minute where the maximum solids content of the total combined liquid will be 5000 p.p.m. or less.

Due to the evaporation of water in the quencher during periods of gas flow therethrough, the system will require the delivery of makeup water to the recycle tank equivalent to the amount of moisture evaporated in cooling the hot furnace gases. This quantity will vary between zero and 700 gallons per minute, depending upon the amount of water evaporated in the quencher. The makeup water flow is regulated by the conventional level control device 40 which operates a valve in the makeup line 41 in response to changes in the level of liquid in the recycle tank.

In the example described, flow is regulated by control of the withdrawal rate of liquid from the seal tank through the pump 32 and from the recycle tank by the pump 42. All other liquid flows are regulated by suitable valves or orifices adjusted to maintain a substantially uniform rate of flow through the connecting pipes.

With this arrangement the flow of makeup water to the thickener is maintained at a constant and minimum amount while maintaining a relatively low solids concentration in the water to the venturi scrubber 14. The only variable controls necessary in a stabilized recycle operation is in the pump 42 between the recycle tank and the venturi scrubber, and the makeup flow to the recycle tank.

What is claimed is:

1. Apparatus for separating dust from hot furnace gases comprising a furnace cyclically discharging hot dust-laden gas, a first gas-liquid spray contact means for evaporatively cooling said gas during its flow period and removing the coarser dust particles from the gas in the form of a slurry, a second gas-liquid spray contact means for removing finer particles retained in the gas leaving said first contact means for discharge therefrom in the form of a slurry, means for discharging substantially clean gas from said second gas-liquid contact means to the atmosphere, a thickener for separating solids from liquids, wherein the improvement comprises a recycle tank for storing liquid, means connecting said tank with said second gas-liquid spray contact means for delivery of liquid to the latter, means for passing a substantially uniform flow of slurry from said gas-liquid contact means to said thickener, means for passing the substantially solids-free liquid from said thickener to said recycle tank to form a portion of the liquid delivered to said second gas-liquid spray contact means, seal tank means for receiving the slurry separated from the gases in said second gas-liquid contact means and means for dividing the flow from said seal tank into a first liquid portion having a relatively lower solids content and a second liquid portion having a relatively higher solids content than said first portion, said first liquid portion being returned to said recycle tank and forming another portion of the liquid returned to said second gas-liquid spray contact means, and the second liquid portion with a relatively higher solids content being returned directly to said first gas-liquid spray contact means as the sole source of liquid supply thereto.

2. Apparatus according to claim 1 wherein said means passing a substantially uniform portion of slurry to said first gas-liquid spray contact means is operative during gas flow and during periods of substantially no gas flow therethrough.

3. Apparatus according to claim 2 wherein means are provided for decanting excess liquid from the slurry removed from said first contact means during periods of substantially no gas flow therethrough and to deliver said slurry to said recycle tank.

4. Apparatus according to claim 1 wherein means pass a substantially uniform flow of liquid to said second gas-liquid spray contact means during gas flow and during periods of substantially no gas flow therethrough.

5. Apparatus according to claim 4 wherein said means passing liquid to said second gas-liquid spray contact means includes liquid makeup means connected with said recycle tank and operative to compensate for liquid evaporation in said first gas-liquid spray contact means.

6. Apparatus according to claim 1 wherein the amount of liquid passed to said second spray contact means is greater than the amount of liquid passed to said first spray contact means.

References Cited

UNITED STATES PATENTS

| | | | |
|---|---|---|---|
| 2,050,797 | 8/1936 | Kerschbaum et al. | 55—228 X |
| 2,056,266 | 10/1936 | Goodell | 23—48 |
| 2,142,406 | 1/1939 | Nonhebel et al. | 55—228 X |
| 2,180,849 | 11/1939 | Printz | 55—228 X |
| 2,746,564 | 5/1956 | Williams | 55—22 |
| 2,935,375 | 5/1960 | Boucher | 23—2 |
| 3,011,966 | 12/1961 | Jahnentz et al. | 55—223 X |
| 3,016,981 | 1/1962 | Fritz | 261—22 X |
| 3,073,092 | 1/1963 | Ancrum et al. | 55—22 |
| 3,196,930 | 7/1965 | Ebert et al. | 159—4 X |
| 3,315,443 | 4/1967 | Marino | 55—228 X |

FOREIGN PATENTS 390,144　　1933　　Great Britain.

HARRY B. THORNTON, *Primary Examiner.*

D. TALBERT, *Assistant Examiner.*